United States Patent [19]

Allen

[11] Patent Number: 5,100,985

[45] Date of Patent: Mar. 31, 1992

[54] 1,4-BIS(4-ARYLBUTADIENYL) BENZENES EXHIBITING NONLINEAR OPTICAL RESPONSE

[75] Inventor: Diane E. Allen, Springfield, N.J.

[73] Assignee: Hoechst Celanese Corp., Somerville, N.J.

[21] Appl. No.: 675,601

[22] Filed: Mar. 25, 1991

[51] Int. Cl.$^5$ ............................................. C08F 126/02
[52] U.S. Cl. ................................ 526/245; 526/299; 526/263; 526/311
[58] Field of Search ................ 526/245, 299, 311, 263

[56] References Cited

U.S. PATENT DOCUMENTS 4,801,670  1/1989  DeMartino et al. ............... 526/263
4,855,376  8/1989  DeMartino et al. ............... 526/311

*Primary Examiner*—Joseph L. Schofer
*Assistant Examiner*—M. Nagumo
*Attorney, Agent, or Firm*—Depaoli & O'Brien

[57] ABSTRACT

In one embodiment this invention provides novel organic compounds and polymers characterized by a 1,4-bis(4-arylbutadienyl)benzene structure which exhibits third order nonlinear optical response.

Illustrative of an invention compound is 1,4-bis[4-(4-N,N-dimethylaminophenyl)butadienyl]2,5-dinitrobenzene:

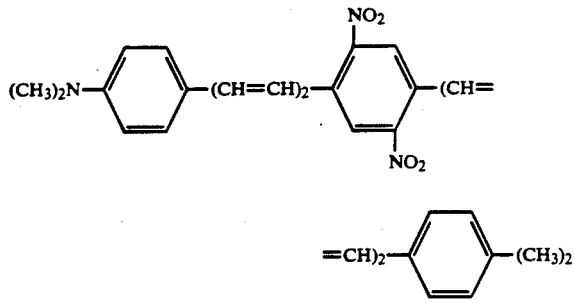

10 Claims, No Drawings

1,4-BIS(4-ARYLBUTADIENYL) BENZENES EXHIBITING NONLINEAR OPTICAL RESPONSE

Thin films of organic polymeric materials with large optical nonlinearities in combination with silicon-based electronic circuitry have potential as systems for laser modulation and deflection, information control in optical circuitry, and the like.

Novel processes occurring through third-order nonlinearity such as degenerate four wave mixing or optical bistability have potential utility in such diverse fields as optical communications and integrated circuit fabrication.

P. W. Smith in Bell System Techn. J.,6, 1975 (1982) proposes that $\chi^{(3)}(\omega_1,\omega_2,\omega_3)$, and especially the degenerate third order nonlinear susceptibility $\chi^{(3)}(-\omega,\omega,\omega)$ [defined as $\chi^{(3)}(\omega)$], be utilized through its contributions to the changes in dielectric constant $\epsilon$ with optical field strength E:

$$\epsilon = \epsilon_1(\omega) + 4\pi\chi^{(3)}(-\omega,\omega,\omega)E^2(\omega)$$

$\chi^{(3)}(\omega)$ also contributes to such well known effects as self-focusing, self-trapping and self-bending of light, degenerate four wave mixing and phase conjugation.

The theory and practice of third order nonlinear optical processes are treated in publications which include:

D. Frohlich, "Advances in Solid Physics: Festkoer Problem"; Pergamon, New York, Vol. XXI (1981).

M.D. Levenson and J.J. Song."Coherent Nonlinear Optics", chapter 7; Springer, New York (1981).

Y.R. Shen, Rev. Mod. Phys., 48, 1 (1976).

D.M. Pepper, Opt. Eng., 21, 156 (1982).

Y.R. Shen, "The Principles of Nonlinear Optics"; John Wiley & Sons, New York (1984).

There is continuing research effort to develop new types of organic nonlinear optical media for devices adapted for applications such as laser frequency conversion, phase-conjugate optics, light valves, optical switches, optical multiplexing-demultiplexing systems, and the like.

Accordingly, it is an object of this invention to provide novel organic compounds which exhibit nonlinear optical response.

It is another object of this invention to provide polymeric materials which exhibit third order nonlinear optical susceptibility $\chi^{(3)}$.

It is a further object of this invention to provide optical devices which contain an organic nonlinear optical component which exhibits third order nonlinear optical susceptibility $\chi^{(3)}$.

Other objects and advantages of the present invention shall become apparent from the accompanying description and examples.

DESCRIPTION OF THE INVENTION

One or more objects of the present invention are accomplished by the provision of 1,4-bis(4-arylbutadienyl)benzene compounds corresponding to the formula:

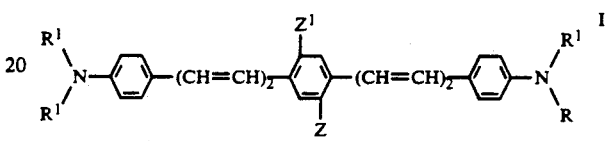

where R or $R^1$ is hydrogen or a $C_1$–$C_4$ alkyl substituent, and R and $R^1$ taken together with the connecting nitrogen atom is a $C_4$–$C_9$ alicyclic substituent; Z is —$NO_2$, —CN or —$CF_3$; and $Z^1$ is —H, —$NO_2$, —CN or —$CF_3$.

In another embodiment this invention provides 1,4-bis(4-arylbutadienyl)benzene compounds corresponding to the formula:

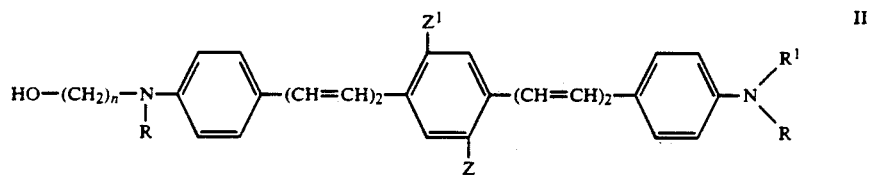

where n is an integer with a value of 1–12; R or $R^1$ is hydrogen or a $C_1$–$C_4$ alkyl substituent, and R and $R^1$ taken together with the connecting nitrogen atom is a $C_4$–$C_9$ alicyclic substituent; Z is —$NO_2$, —CN or —$CF_3$; and $Z^1$ is —H, —$NO_2$, —CN or —$CF_3$.

In another embodiment this invention provides acrylic monomers corresponding to the formula:

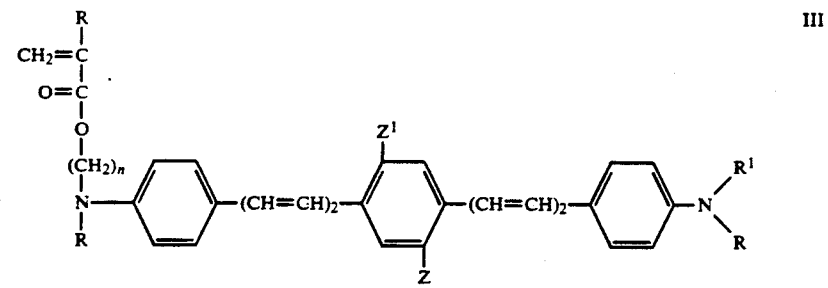

where n is an integer with a value of 1–12; R or $R^1$ is hydrogen or a $C_1$–$C_4$ alkyl substituent, and R and $R^1$ taken together with the connecting nitrogen atom is a $C_4$–$C_9$ alicyclic substituent; Z is —$NO_2$, —CN or —$CF_3$; and $Z^1$ is —H, —$NO_2$, —CN or —$CF_3$.

In another embodiment this invention provides diacrylic monomers corresponding to the formula:

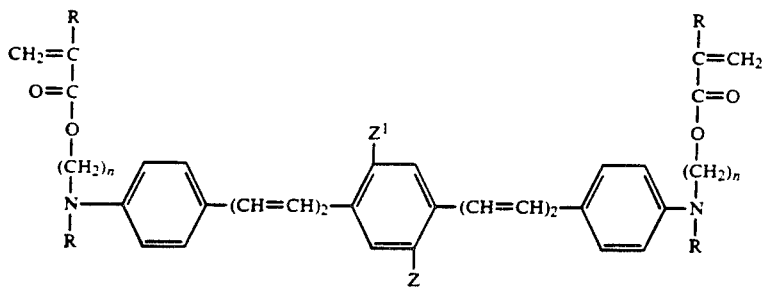

IV where n is an integer with a value of 1-12; R is hydrogen or a $C_1$-$C_4$ alkyl substituent; Z is $-NO_2$, $-CN$ or $-CF_3$; and $Z^1$ is $-H$, $-NO_2$, $-CN$ or $-CF_3$.

In another embodiment this invention provides a polymer which is characterized by recurring monomeric units corresponding to the formula:

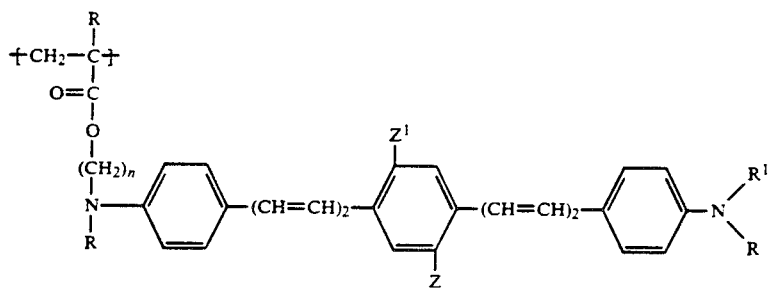

V where n, R, $R^1$, Z and $Z^1$ are as previously defined. An invention polymer typically has a weight average molecular weight between about 5000-200,000, and a glass transition temperature in the range between about 40°-150° C.

In another embodiment this invention provides a polymer which is characterized by recurring monomeric units corresponding to the formula:

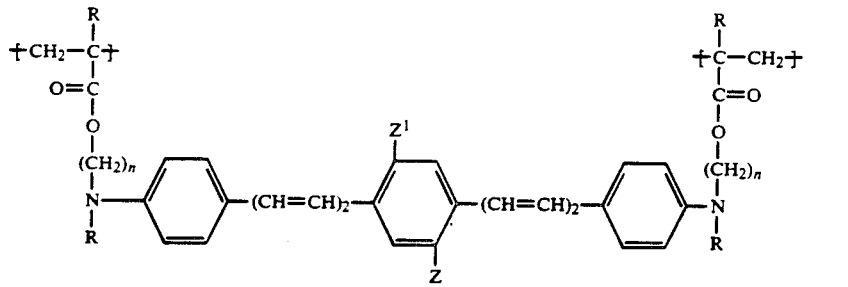

VI where n, R, Z and $Z^1$ are as previously defined.

A present invention 1,4-bis(4-arylbutadienyl)benzene structure exhibits third order nonlinear optical susceptibility $\chi^{(3)}$, as contributed by the extended conjugation electronic bridging of electron-donor and electron withdrawing groups. A present invention nonlinear optical medium can exhibit a $\chi^{(3)}$ harmonic generation level of at least about $1\times 10^{-12}$ esu, and typically will be greater than about $10\times 10^{-12}$ esu, as measured at 1.91 μm excitation wavelength.

The theory of nonlinear harmonic generation by frequency modulation of coherent light is elaborated by A.F. Garito et al in Chapter 1, "Molecular Optics:Nonlinear Optical Properties of Organic and Polymeric Crystals"; AACS Symposium Series 233 (1983).

A present invention polymer can be in the form of a homopolymer or a copolymer. Polymerization procedures for preparing polymers and copolymers are described in publications such as U.S. Pat. Nos. 3,354,084; 4,115,339; 4,254,249; 4,395,524; 4,855,376; 4,865,430; and references cited therein.

A present invention acrylic or diacrylic monomer as represented in Formulas III-IV can be polymerized with one or more comonomers which include dialkylacrylamide, acrylonitrile, methacrylonitrile, alkyl acrylate or methacrylate, alkyl vinyl ether, maleic anhydride, vinyl halide, vinylidene halide, vinylidene cyanide, vinyl alkylate, styrene, alkene, and the like.

In another embodiment this invention provides a nonlinear optical medium consisting of a transparent film composed of a polymeric matrix containing a 1,4-bis(4-arylbutadienyl)benzene compound corresponding to formula I as previously defined.

In another embodiment this invention provides a nonlinear optical medium consisting of a transparent film of a polymer which is characterized by recurring monomeric units corresponding to the structure represented in Formula V or Formula VI as previously defined.

In another embodiment this invention provides an optical light switch or light modulator device with an improvement which comprises a nonlinear optical component comprising a transparent solid medium composed of a polymeric matrix containing a 1,4-bis(4-arylbutadienyl)benzene compound corresponding to formula I as previously defined.

In a further embodiment this invention provides an optical light switch or light modulator device with an improvement which comprises a nonlinear optical component comprising a transparent solid medium of a polymer which is characterized by recurring monomeric units corresponding to the structure represented in Formula V or Formula VI as previously defined.

In the above represented formulas I-VI, R and $R^1$ are substituents selected from hydrogen and $C_1$-$C_4$ alkyl radicals which include methyl, ethyl, propyl, isopropyl, butyl, isobutyl and 2-butyl. R and $R^1$ when taken together with the connecting nitrogen is a $C_4$-$C_9$ alicyclic substituent such as pyrolidyl, piperidyl, piperazyl, tetrahydroquinoline, and the like.

The term "solid solution" as employed herein refers to a homogeneous single phase alloy of guest organic compounds and host polymeric matrix components. Solid solutions are illustrated in U.S. Pat. Nos. 4,428,873 and 4,776,171.

The term "transparent" as employed herein refers to a polymeric optical medium which is transparent or light transmitting with respect to incident fundamental and created light frequencies. In a present invention optical device, the polymeric thin film nonlinear optical medium component is transparent to both the incident and exit light frequencies.

A present invention optical device can be a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like as elaborated in U.S. Pat. Nos. 4,767,169 and 4,775,215.

An optical interferometric waveguide gate device is described by A. Lattes et al in IEEE J. Quantum Electronics, QE-19(11), 1718 (1983).

A wide-band electrooptical guided-wave analog-to-digital converter device is described by R.A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P.W. Smith et al in Applied Physics letters, 30(6); 280 (1977) and in IEEE Spectrum, June 1981.

Optical parametric devices are described in U.S. Pat. Nos. 3,371,220; 3,530,301; and 3,537,020.

A present invention optical device can be achieved by constructing one of the optical devices described in the technical literature, except that a present invention polymer medium is utilized as the nonlinear optical component.

SYNTHESIS PROCEDURES

A. 1,4-bis(4-arylbutadienyl)benzenes[1]

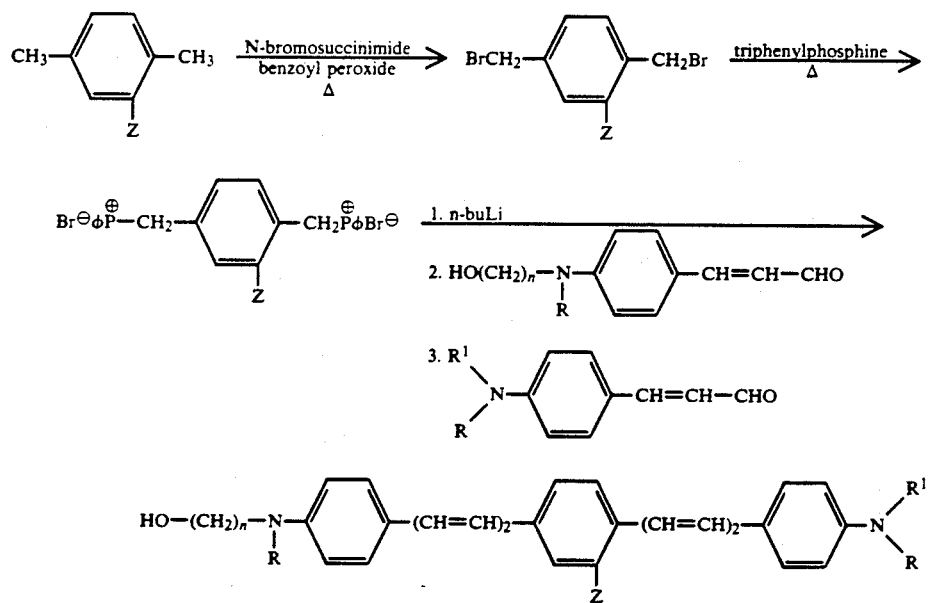

[1] J. Org. Chem., 24, 1969 (1959).

B. Acrylic monomers and copolymers

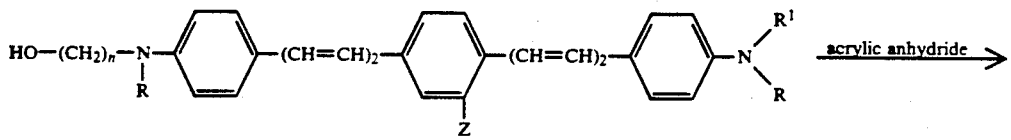

―continued

B. Acrylic monomers and copolymers

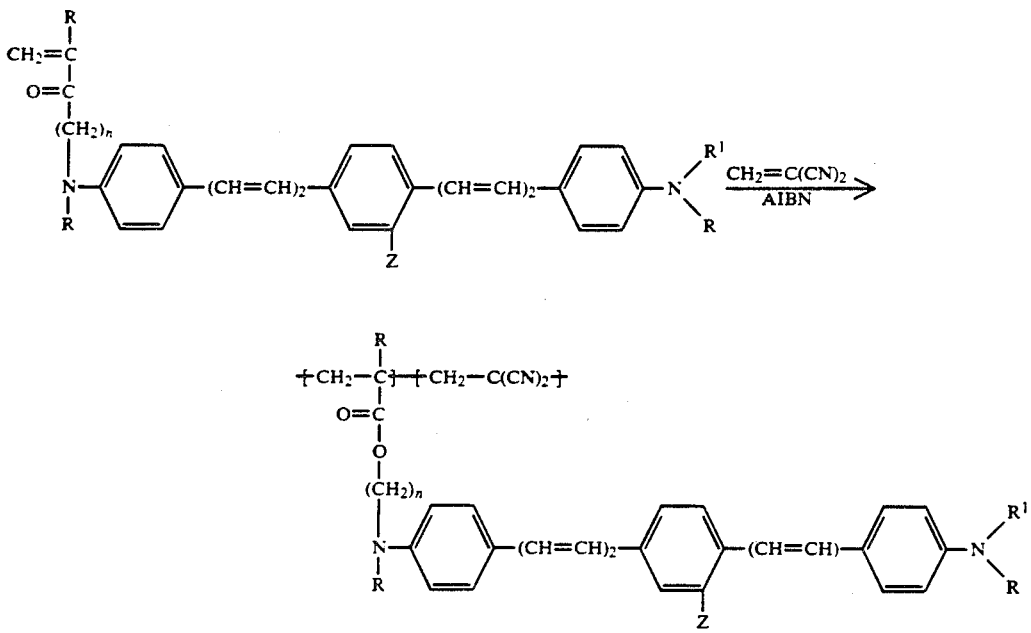

The following examples are further illustrative of the present invention. The components and specific ingredients are presented as being typical, and various modifications can be derived in view of the foregoing disclosure within the scope of the invention.

EXAMPLE I

This example illustrates the preparation of 1,4-bis(4-N,N-dimethylaminophenyl)butadienyl]-2-nitrobenzene.

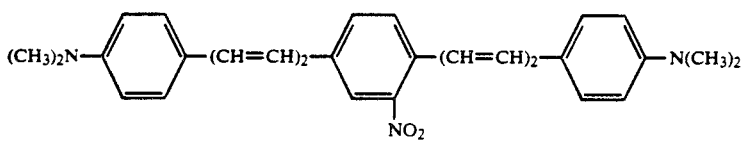

A.

A reactor is charged with 2-nitro-1,4-xylene (0.1 mole), N-bromosuccinimide (0.21 mole), benzoyl peroxide (2 mole %) and 350 ml of carbon tetrachloride, and the reaction medium is heated at reflux for 20 hours. After cooling to room temperature, the reaction medium is diluted by the addition of carbon tetrachloride, and solid byproducts which separate are removed by filtration. The filtrate is concentrated in vacuo, and hexane is added to the oily residue which crystallizes on standing. The crude 1,4-di(bromomethyl)-2-nitrobenzene product is recrystallized from ethanol/benzene.

B.

A solution of triphenylphosphine (0.15 mole), 1,4-di(-bromomethyl)-2-nitrobenzene (0.06 mole) and 200 ml of xylene in a reactor is heated at reflux for 20 hours. After cooling to room temperature, the 2-bromo-1,4-xylylene-bis(triphenylphosphonium bromide) product which precipitates is collected by filtration, washed with xylene, and dried.

C.

To a stirred solution of bisphosphonium bromide salt (0.04 mole) in 150 ml of ethanol is added dropwise 500 ml of 0.2M lithium ethoxide solution. After two hours at room temperature a solution of 4-N,N-dimethylaminocinnamaldehyde (17.5 g, 0.1 mole) in 200 ml of ethanol is added dropwise, and the reaction mixture is stirred at room temperature for 20 hours. Water is added, and the precipitate is filtered, washed with 60% aqueous ethanol, dried under vacuum, and recrystallized from dimethylformamide to provide the title compound as a red-orange crystalline solid.

D.

By means of the procedures described above, the following compounds are prepared with the appropriately substituted reactants:

1,4-bis[4-(4-N,N-dimethylaminophenyl)butadienyl]-2,5-dinitrobenzene;
1,4-bis[4-(4-N,N-diethylaminophenyl)butadienyl]-2-cyanobenzene;
1,4-bis[4-(4-piperid-1-ylphenyl)butadienyl]-2-trifluoromethylbenzene.

EXAMPLE II

This Example illustrates the preparation of a copolymer (25/75) in accordance with the present invention.

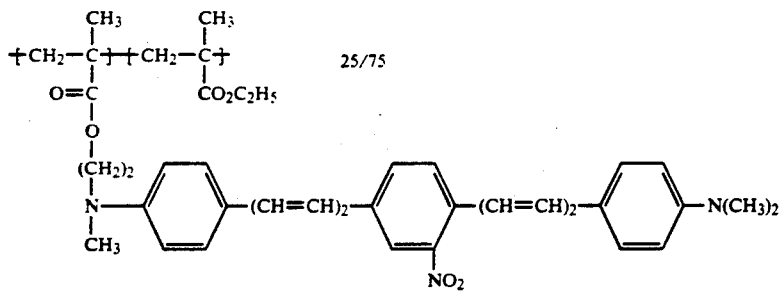

A. Preparation of side chain monomer

1-[4-[4N,N-(2-hydroxyethyl)-methylaminophenyl]-butadienyl]-4-[4(4-N,N-dimethylaminophenyl)-butadienyl]-2-nitrobenzene is prepared following the procedures described in Example I, with the following modifications.

The bisphosphonium bromide intermediate is reacted first with one equivalent of 4-N,N-dimethylaminocinnamaldehyde, and then with one equivalent of 4-N,N-(2-hydroxyethyl)methylaminocinnamaldehyde methacrylate ester. The corresponding 2,5-dinitrobenzene derivative is prepared in the same manner.

B. Formation of 25/75 copolymers

The side chain monomer (0.05) mole) and ethyl methacrylate (0.15 mole) are dissolved in trichloropropane (10% solution by weight of solutes), and the solution is degassed for 15 minutes. Azo-bis-isobutyronitrile (1 mole %) is added to the mixture, and the solution is degassed for an additional 15 minutes. The reaction is then heated at 70° C. under argon for 20 hours. After cooling to room temperature, the copolymer is precipitated into ethanol and collected by filtration. Purification is achieved by redissolving the copolymer in trichloropropane and precipitating it into tetrahydrofuran.

EXAMPLE III

This Example illustrates the measurement of the third order nonlinear optical susceptibility $\chi^{(3)}$ of an invention 1,4-bis(4-arylbutadienyl)benzene compound.

A.

A reactor is charged with 75 g of N,N-dimethylmethacrylamide (weight average M.W. of 80,000), 25 g of the Example I titled compound, and 0.1 g of azo-bis-isobutyronitrile. The flask is purged with argon, then sealed and placed in a 60°-70° C. oil bath. The recovered product is an optically transparent solid solution.

B.

The optical system utilized for $\chi^{(3)}$ measurement is similar to that described in U.S. Pat. No. 4,775,215, and in Phys. Rev. Lett., 50, 350 (1983) and Phys. Rev., B28, 6766 (1983) by C.C. Teng and A.F. Garito.

The apparatus consists of a pulsed Nd:YAG Q-switched laser as a pump source for a compressed hydrogen Raman cell yielding an output laser beam at 1.907 μm from the first Stokes line. The output beam is then divided into two optical paths: the reference path to eliminate signal instabilities due to input beam power fluctuations, and the sample path to provide the fundamental beam for third harmonic generation.

The sample is located on a computer controlled rotational stage for obtaining the Maker fringes of the third harmonic signal. The measurement is relative to glass which has a third order optical susceptibility $\chi_G(-3\omega; \omega,\omega,\omega)=4.67\times10^{-14}$ esu. By comparing the third harmonic signal from the sample $I_S$ with that from glass $I_G$.

A thin film (about 2.0 μm) is prepared by dissolving 15% by weight of the above described polymeric solid solution in dimethylformamide and casting the solvent medium onto a substrate. A thin film forms on the substrate after the solvent is evaporated.

Absorption spectra indicate that the film is transparent at the fundamental optical wavelength and the third harmonix wavelength.

The $\chi^{(3)}$ of the film is above about $10\times10^{-12}$ esu as measured with the above described optical system.

What is claimed is:

1. A polymer which is charcterized by recurring monomeric units corresponding to the formula:

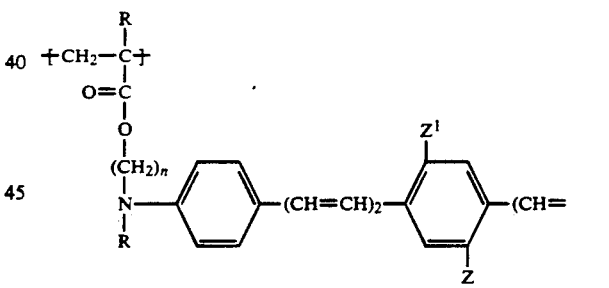

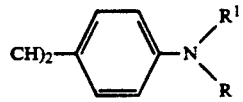

where n is an integer with a value of 1-12; R or $R^1$ is hydrogen or a $C_1$-$C_4$ alkyl substituent, and R and $R^1$ taken together with the connecting nitrogen atom is a cyclic substituent selected from the group consisting of pyroldyl, piperidyl, piperazyl and tetrahydroquindine; Z is —$NO_2$, —CN or —$CF_3$; and $Z^1$ is —H, —$NO_2$, —CN or —$CF_3$.

2. A polymer in accordance with claim 1 which has a weight average molecular weight in the range between about 5000-200,000.

3. A polymer in accordance with claim 1 which has a glass transition temperature in the range between about 40°-150° C.

4. A polymer which is characterized by recurring monomeric units corresponding to the formula:

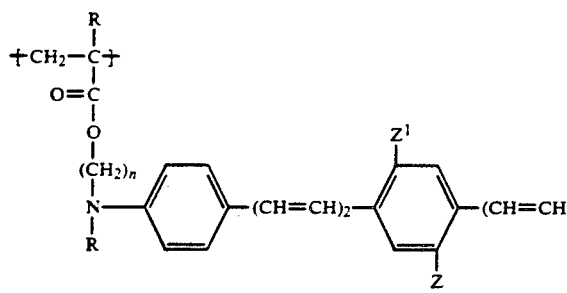
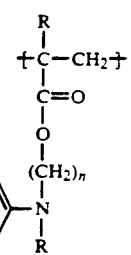

where n is an integer with a value of 1-12; R is hydrogen or a $C_1-C_4$ alkyl substituent; Z is $-NO_2$, $-CN$ or $CF_3$; and $Z^1$ is $-H$, $-NO_2$, $-CN$ or $-CF_3$.

5. A nonlinear optical medium consisting of a transparent film of a polymer which is characterized by recurring monomeric units corresponding to the formula:

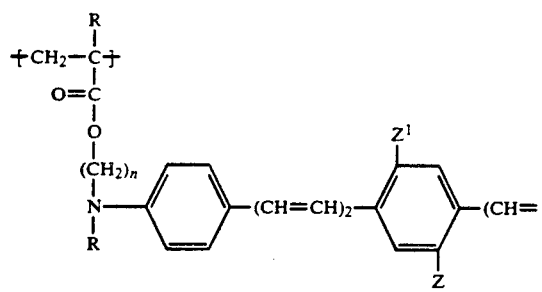

where n is an integer with a value of 1-12; R or $R^1$ is hydrogen or a $C_1-C_4$ alkyl substituent, and R and $R^1$ taken together with the connecting nitrogen atom is a cyclic substituent selected from the group consisting of pyrolidyl, piperidyl, piperazyl and tetrahydroquiandine; Z is $-NO_2$, $-CN$ or $-CF_3$; and $Z^1$ is $-H$, $-NO_2$, $-CN$ or $-CF_3$.

6. A nonlinear optical medium in accordance with claim 5 wherein the film exhibits third order nonlinear optical susceptibility $\chi^{(3)}$.

7. A nonlinear optical medium consisting of a transparent film of a polymer which is characterized b recurring monomeric units corresponding to the formula:

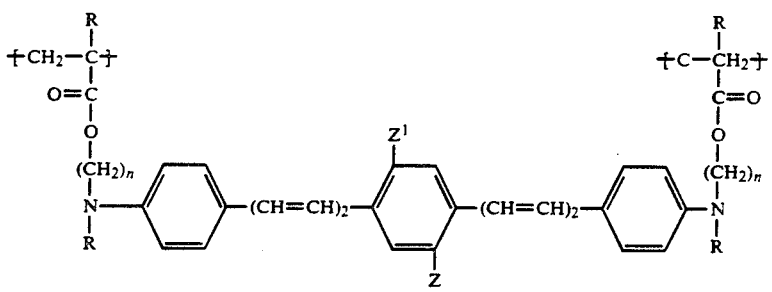

where n is an integer with a value of 1-12; R is hydrogen or a $C_1-C_4$ alkyl substituent; Z is $-NO_2$, $-CN$ or $CF_3$; and $Z^1$ is $-H$, $-NO_2$, $-CN$ or $-CF_3$.

8. A nonlinear optical medium in accordance with claim 7 wherein the film exhibits third order nonlinear optical susceptibility $\chi^{(3)}$.

9. In an optical light switch or light modulator device the improvement which comprises a nonlinear optical component comprising a transparent solid medium of a polymer which is characterized by recurring monomeric units corresponding to the formula:

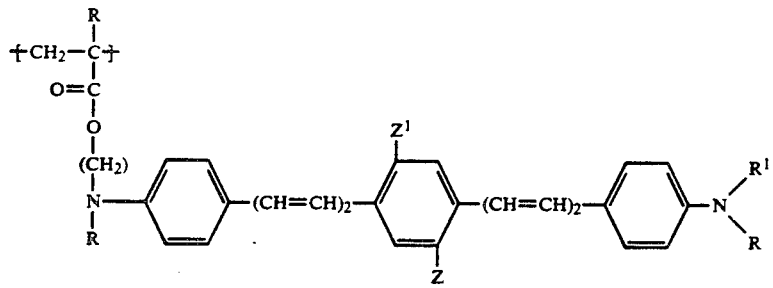
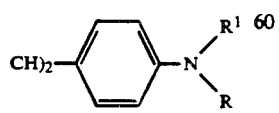

where n is an integer with a value of 1-12; R or $R^1$ is hydrogen or a $C_1-C_4$ alkyl substituent, and R and $R^1$ taken together with the connecting nitrogen atom is a cyclic substituent; Z is $-NO_2$, $-CN$ or $-CF_3$; and $Z^1$ is $-H$, $-NO_2$, $-CN$ or $-CF_3$.

10. In an optical light switch or light modulator device the improvement which comprises a nonlinear optical component comprising a transparent solid medium of a polymer which is characterized by recurring monomeric units corresponding to the formula:
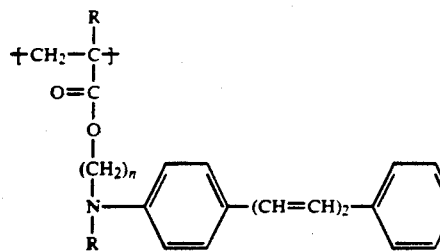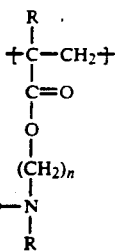
where n is an integer with a value of 1–12; R is hydrogen or a $C_1$–$C_4$ alkyl substituent; Z is —$NO_2$, —CN or —$CF_3$; and $Z^1$ is —H, —$NO_2$, —CN or —$CF_3$.
* * * * *